United States Patent [19]

Hamada et al.

[11] Patent Number: 4,914,553
[45] Date of Patent: Apr. 3, 1990

[54] LIGHTING DEVICE

[75] Inventors: Hiroshi Hamada, Yamatokoriyama; Naofumi Kimura, Nara; Fumiaki Funada, Yamatokoriyama, all of Japan

[73] Assignee: Sharp Kabushiki Kaisha, Osaka, Japan

[21] Appl. No.: 249,222

[22] Filed: Sep. 22, 1988

Related U.S. Application Data

[63] Continuation of Ser. No. 52,201, May 19, 1987, abandoned, which is a continuation of Ser. No. 756,821, Jul. 19, 1985, abandoned.

[30] Foreign Application Priority Data

Jul. 26, 1984 [JP] Japan .................................. 59-156731

[51] Int. Cl.⁴ ............................................... F21V 7/04
[52] U.S. Cl. ........................................ 362/32; 362/31; 362/311; 362/355; 350/345
[58] Field of Search ..................... 362/26, 31, 32, 311, 362/339, 223, 294; 350/345

[56] References Cited

U.S. PATENT DOCUMENTS

| | | | |
|---|---|---|---|
| 2,797,311 | 6/1957 | Jurick | 362/223 |
| 4,183,628 | 1/1986 | Laesser et al. | 350/338 |
| 4,252,416 | 2/1981 | Jaccard | 350/345 |
| 4,528,617 | 7/1985 | Blackington | 362/32 |

FOREIGN PATENT DOCUMENTS 196226  3/1908  Fed. Rep. of Germany ........ 362/32

Primary Examiner—Martin P. Schwadron
Assistant Examiner—Allen J. Flanigan
Attorney, Agent, or Firm—Birch, Stewart, Kolasch & Birch

[57] ABSTRACT

The lighting device is equipped with a light guide having a linear Fresnel reflection surface consisting of steps of continuously alternating reflecting surfaces having two different reflection angles. A light source is installed at one end of the light guide of the above construction so that the light from the light source is emitted from the irradiation surface of the light guide after being reflected by the linear Fresnel reflection surface.

11 Claims, 2 Drawing Sheets

LIGHTING DEVICE

This application is a continuation of application Ser. No. 07/052,201 filed on May 19, 1987, now abandoned, which is a continuation of Ser. No. 06/756,821 filed on July 19, 1985, also abandoned.

BACKGROUND OF THE INVENTION

The present invention relates to a light guide for the back light of a passive display device, or particularly a liquid crystal display. Generally, the display device is classified into an active (luminous) type and a passive (non-luminous) type. The active type display device includes a light emitting diode, a plasma display and an electroluminescent display which give displays by emitting light by themselves. The passive type display device includes a liquid crystal display (hereinafter abbreviated as LCD) and an electrochromitter display device which do not emit light by themselves but modulate natural light or the light from other light sources through the control of light transmittance or reflectance so as to give pattern displays. When it is dark around the device, therefore, the passive type display device gives an obscure display unless provided with a special lighting means.

An LCD which consumes little power has wide applications in portable electronic devices such as electronic desk calculators and watches. In most LCD's whose display mode utilizes the optical anisotropy of liquid crystal, superposition of deflector plates is an essential constituent feature, and about 50% of the illumination light is shielded by the deflector plates. When a color filter is provided in the LCD, the light intensity is further reduced by the color filter. Accordingly, it is indispensable to install lighting means in the device for normal operation in a room. Because of the large restriction on the power supply available for the portable electronic display device, brighter lighting with as small power consumption as possible is the most important object in manufacturing the display device.

If the display device is operated, using the built-in lighting means alone, in an environment as bright as outdoors in the day time, the display will be obscure and illegible. An increase in the luminance of the display would, however, result in the increased power consumption by the lighting means, and spoil the low power consumption characteristic of the LCD.

SUMMARY OF THE INVENTION

Accordingly, it is an object of the present invention to provide a novel useful lighting device which includes a light guide of such a technically devised configuration as to permit a bright display with good light utilization regardless of whether the lighting device uses a built-in light source or an external light source.

Another object of the present invention is to provide a lighting device for a display device in which a light source is provided at one end of a light guide that has a linear Fresnel reflector. The device consists of steps of continuously alternating reflecting surfaces having two different reflection angles so that the light from the light source is reflected by the linear Fresnel reflector and emitted from the irradiation surface of the light guide.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, the lighting device as an embodiment of the present invention, comprises a light source installed at one end of a light guide having a linear Fresnel reflector consisting of steps of continuously alternating reflecting surfaces having two different reflection angles so that the light from the light source is reflected by the linear Fresnel reflector and emitted from the irradiation surface of the light guide.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
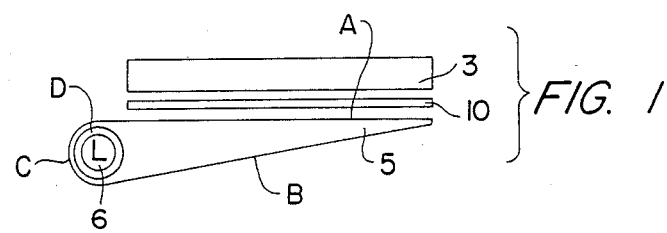
FIG. 1 illustrates a cross-sectional view of the light guide of the present invention.
Figure 2:
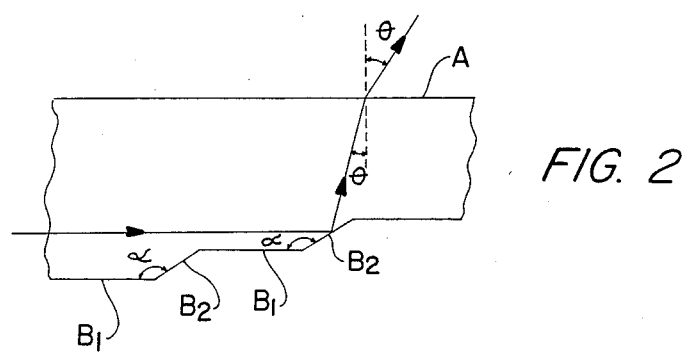
FIG. 2 illustrates the linear Fresnel reflector in an enlarged view, of a lighting device as an embodiment of the present invention.

As shown in FIGS. 1 and 2, the light guide 5 of a lighting device according to the present invention may have the following construction:

(1) It has a flat and smooth irradiating surface A with the same configuration as the light receiving surface of a display panel 3 that is to be irradiated, such as an LCD.

(2) It has a linear Fresnel reflection surface B at an acute angle to the irradiating surface A.

(3) As shown by an enlarged view in FIG. 2, the linear Fresnel reflection surface B consists of steps of alternately aligned surfaces $B_1$ and surfaces $B_2$, said surfaces $B_1$ being substantially parallel to the irradiating surface A, said surfaces $B_2$ forming an angle $\alpha$ with said surfaces $B_1$.

(4) The angle $\alpha$ s obtained by the formula:
$$\alpha = \tfrac{1}{2}\sin^{-1}(\sin\theta/n) + 135° \tag{1}$$

in which $\theta$ is the optimum viewing angle for the display panel and n is the reflective index of the light guide material where air is assumed to be the medium surrounding the light guide 5.

(5) A semi-cylindrical reflecting surface C is formed between the irradiating surface A and the linear Fresnel reflection surface B at their open ends.

(6) A hollow cylinder D is formed around the center axis of an aperture near the focusing line of the reflecting surface C.

(7) The hollow cylinder D accommodates an cylindrical light source 6 (in such a manner that the light source 6 does not come in contact with the inner wall of the hollow cylinder D).

Figure 3:
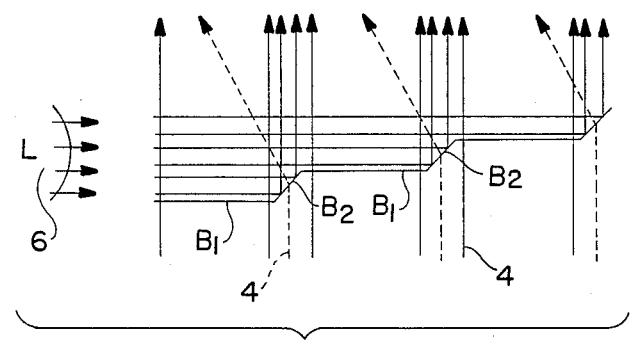
FIGS. 3 and 4 illustrate the light reflecting directions in the lighting device shown in FIG. 1.

In the lighting device of the above-mentioned construction, the light emitted from the light source 6 travels through the following course to the display panel 3:

A light component parallel to the irradiating surface A is totally reflected by one of the surfaces $B_2$ and emitted in the direction of the display panel as shown in FIG. 3. If the light guide 5 is made of acrylic resin (n=1.49, critical angle=42°), the value α calculated by the formula (1) with "0" substituted for θ is 135°, which meets the requirement for total reflection.

Figure 4:
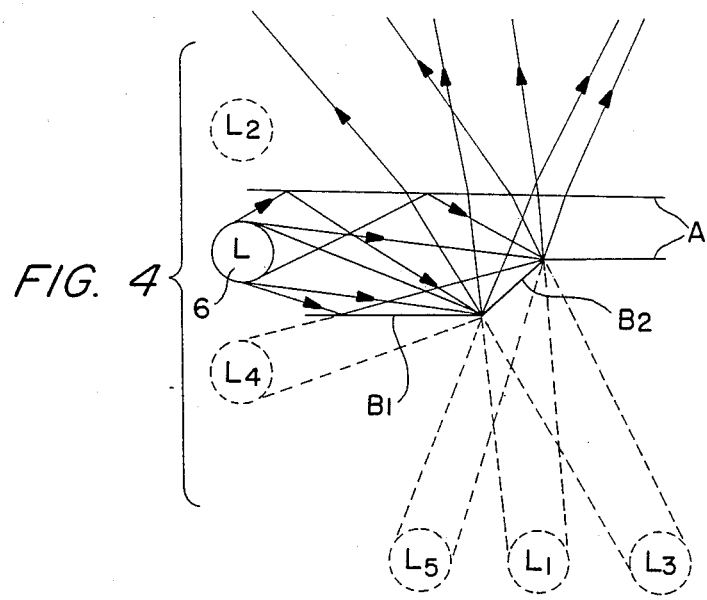

A light component not in parallel to the irradiating surface A is reflected as shown in FIG. 4.

Specifically, the light component reflected only once by the surface $B_2$ is emitted from the surface A as if it were irradiated, through the slit at the position of the surface $B_2$, from the inverted image $L_1$ of the light source 6 on the surface $B_2$. The light component reflected by the surface A and then by the surface $B_2$ is emitted from the surface A as if it were irradiated, through the slit at the position of the surface $B_2$, from the inverted image $L_3$ on the surface $B_2$ of the inverted image $L_2$ of the light source 6 on the surface A. Similarly, the light component reflected by the surface $B_1$ and then by the surface $B_2$ is emitted from the surface A as if it were irradiated, through the slit at the position of the surface $B_2$, from the inverted image $L_5$ on the surface $B_2$ of the inverted image $L_4$ of the light source 6 on the surface $B_1$. In the case of multiple reflection between the surfaces A and B, inverted images are further formed in addition to the inverted images $L_3$ and $L_5$, but they are negligibly dark because the light loss increases with the number of reflections. Accordingly, the light emitted from the surface A provides a luminous intensity distribution with the peak in θ direction.

The reflecting surface C reflects light components irradiated in the opposite direction of the linear Fresnel surface B to ensure effective utilization of the light. A light component almost at the right angle to the reflecting surface C is reflected back to the light source. A light component obliquely irradiated on the reflecting surface C is, however, reflected several times between the reflecting surface C and the inner wall of the hollow cylinder D before being led toward the linear Fresnel surface side. As a result, the voids between the inverted images of the light source are filled by additional inverted images obtained by the reflecting surface C. Consequently, the resultant luminance is equivalent to that of a panel light source viewed through the slit at the position of the surface $B_2$.

Figure 5:
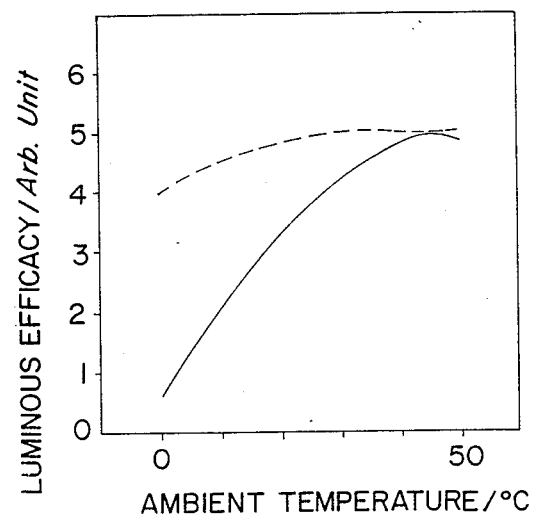
FIG. 5 illustrates the luminous efficacy characteristic by ambient temperature of a fluorescent lamp.

The hollow cylinder D that houses the light source 6 provides another effect as follows. Among small white light sources presently available for practical use, a fluorescent lamp (hot cathode fluorescent discharge tube) has the highest luminous efficacy (total luminous flux/power consumption) but has a disadvantage in that its luminous effect largely depends upon temperature. This is because the vapor pressure of mercury depends upon temperature. At a low temperature, therefore, the luminous efficacy significantly drops. One of the possible countermeasures against this phenomenon is to prevent the temperature drop of the fluorescent lamp. In the light guide in the embodiment of the present invention, the fluorescent lamp is installed in the hollow cylinder D in such a manner that the lamp does not come in contact with the inner wall of the hollow cylinder D. The air in the clearance thus formed serves as a heat insulating layer to trap the heat of the self-heated fluorescent lamp. As a result, the luminous efficacy does not significantly drop even if the ambient temperature drops. FIG. 5 is a graph showing the change of the luminous efficacy of a fluorescent lamp by ambient temperature. The solid line indicates the luminous efficacy characteristic of the fluorescent lamp when the light guide of the present invention is not used. The broken line indicates the luminous efficacy characteristic when the light guide of the present invention is used.

When viewed from the display panel side, the light guide looks luminous only at the surfaces $B_2$. If this provides inconvenience, a diffuse transmissive plate or sheet 10 may be provided between the surface A and the display panel. The diffuse transmissive plate or sheet may be, for example, made of an opal glass or synthetic resin that has light scattering effect. The material with lower diffusion property effects more favorable display quality because of the smaller light loss.

Now, the effect of the external light admitted from the rear of the light guide will be described in the following. As shown in FIG. 3, an external light component 4 entering the surface $B_2$ from under the light guide is reflected when coming out of the surface $B_2$. An external light component 4 entering the surface $B_1$ is, on the contrary, emitted from the surface A in a direction at the same angle as the incident angle because the surface $B_1$ is in parallel with the surface A. Generally, the linear Fresnel surface is designed so that the surfaces $B_1$ are larger than the surfaces $B_2$. Consequently, a major portion of the external light entering the light guide is effectively utilized.

Acrylic resin, styrene plastics or polycarbonate are suitable materials for the light guide of the present invention because of the transparency and good workability of these materials, though the material need not be limited to the above.

As is obvious from the above description, the lighting device of the present invention permits efficient utilization of not only the built-in illumination but also an external light. Furthermore, when the built-in light source is a fluorescent lamp, its temperature characteristic can be improved by the present invention.

The angle formed between the surface A and the surface B may be less than about 20 degrees, preferably about 10 to about 15 degrees.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A lighting device for backlighting a passive display device having a planar display surface and an acute optimum viewing angle θ defined from a perpendicular to said display surface, comprising:

a fluorescent lamp having a cylindrical light emitting surface;

a transparent cylindrical housing for said fluorescent lamp, said housing having a transparent surface spaced substantially equidistant from the cylindrical light emitting surface of said fluorescent lamp to form an air cavity therebetween, said air cavity forming a heat insulating layer to improve the luminous efficiency of said fluorescent lamp;

a light guide receiving light from said fluorescent lamp and providing said light to said planar display surface, said light guide being formed of a material having a refractive index n; and diffusion means, disposed between said light guide and said planar display surface and having a low diffusion property, for scattering light between said light guide and said planar display surface to provide a uniform light distribution with a limited light loss;

said light guide including, a first irradiating surface, a second linear reflection surface generally intersecting said first irradiating surface at an acute intersecting angle X with respect thereto, and an open guide end disposed at an opposite edge of said first irradiating surface and second linear reflection surface, said open guide end acting to receive light from said lamp such that a portion is propogated through the light guide at various acute, nonparallel angles to said first irradiating surface, said second linear reflecting surface having first and second alternating reflecting surface portions, said first reflecting surface portions being substantially parallel to said first irradiating surface, said second reflecting surface portions extending at an angle $\alpha$ to an adjacent first reflecting surface portion where $$\alpha = \tfrac{1}{2} \sin^{-1}(\sin\theta/n) + 135°.$$

2. The lighting device of claim 1 wherein said acute intersecting angle X is less than 20°.

3. The lighting device of claim 1 wherein said acute intersecting angle X satisfies the equation, $10° \leq x \leq 15°$.

4. The lighting device of claim 1 further comprising a semi-cylindrical reflecting surface disposed between said first surface and said second surface at said second end.

5. The lighting device of claim 4, wherein said light guide further comprises an aperture having a center axis approximately along a focus line of said semi-cylindrical reflecting surface, said cylindrical light emitting surface of said fluorescent lamp and said transparent surface of said housing being concentrically arranged around said center axis.

6. The lighting device of claim 1 wherein said passive display device has a planar display surface, said acute optimum viewing angle $\theta$ being defined from a perpendicular to said display surface, said light guide being formed of a material having a refractive index n including;

a first irradiating surface, a second linear reflection surface generally intersecting said first irradiating surface at an acute intersecting angle X with respect thereto, an open guide end disposed at an opposite end of said first irradiating surface and second linear reflection surface, said second linear reflecting surface having first and second alternating reflecting surface portions, said first reflecting surface portions being substantially parallel to said first irradiating surface, said second reflecting surface portions extending at an angle $\alpha$ to an adjacent first reflecting surface portion, where $$\alpha = \tfrac{1}{2} \sin^{-1}(\sin\theta/n) + 135°.$$

7. The lighting device of claim 6 wherein said acute intersecting angle X is less than 20°.

8. The lighting device of claim 6 wherein said acute intersecting angle X satisfies the equation, $10° \leq x \leq 15°$.

9. The lighting device of claim 6 further comprising a semi-cylindrical reflecting surface disposed between said first surface and said second surface at said second end.

10. The lighting device of claim 9, wherein said light guide further comprises an aperture having a center axis approximately along a focus line of said semi-cylindrical reflecting surface, said cylindrical light emitting surface of said fluorescent lamp and said transparent surface of said housing being concentrically arranged around said center axis.

11. A lighting device for backlighting a passive display device comprising:

a fluorescent lamp having a cylindrical light emitting surface;

a transparent cylindrical housing for said fluorescent lamp, said housing having a transparent surface spaced substantially equidistant from the cylindrical light emitting surface of said fluorescent lamp to form an air cavity therebetween, said air cavity forming a heat insulating layer to improve the luminous efficiency of said fluorescent lamp;

a light guide, having a first irradiating surface, collecting light from the transparent surface of said housing and directing said light through said passive display device to be emitted therefrom at substantially an acute optimum viewing angle; and diffusion means, disposed between said light guide and said passive display device and having a low diffusion property, for scattering light between said light guide and said passive display device to provide a uniform light distribution with a limited light loss;

said transparent surface acting to receive light from said lamp such that a portion is propogated through the light guide at various acute, non-parallel angles to said first irradiating surface.

* * * * *